United States Patent
Mullenhoff et al.

[15] 3,657,036
[45] Apr. 18, 1972

[54] METHOD FOR PRODUCTION OF RIGID POLYURETHANE ARTICLES

[72] Inventors: James A. Mullenhoff, West Seneca; Walter E. Voisinet, Colden, both of N.Y.

[73] Assignee: National Gypsum Company, Buffalo, N.Y.

[22] Filed: Oct. 2, 1969

[21] Appl. No.: 863,252

[52] U.S. Cl. ............................. 156/79, 156/209, 161/166, 264/47
[51] Int. Cl. ........................................................ B32b 5/18
[58] Field of Search .................. 156/77, 78, 79, 209; 264/46, 264/47, 54; 161/166

[56] References Cited

UNITED STATES PATENTS

| | | | |
|---|---|---|---|
| 2,586,275 | 2/1952 | Toulmin, Jr. | 156/78 X |
| 3,037,897 | 6/1962 | Pelley | 156/79 X |
| 3,257,252 | 6/1966 | Keel | 156/209 X |
| 3,258,513 | 6/1966 | Berry et al. | 156/209 X |
| 3,305,419 | 2/1967 | Voelker | 156/209 |
| 3,433,700 | 3/1969 | Migdol et al. | 156/79 X |
| 3,496,058 | 2/1970 | Schroter et al. | 156/79 X |
| 3,020,587 | 2/1962 | Alderfer et al. | 264/47 X |
| 3,354,503 | 11/1967 | Joseph et al. | 264/47 X |
| 3,475,522 | 10/1969 | Garibian et al. | 264/54 |

*Primary Examiner*—Samuel Feinberg
*Assistant Examiner*—G. E. Montone
*Attorney*—Robert F. Hause

[57] ABSTRACT

A continuous method for the production of rigid polyurethane foam panels having a density gradient across their thickness is described. The panels are comprised of a plurality of layers intimately bonded together with at least two of the individual layers having densities which are not substantially the same. The variance in the density of the layers is achieved by utilizing non-foamable as well as foamable polyurethane compositions or by varying the formulated foam density of, and/or the degree of restraint exerted against the vertical expansion of successively deposited quantities of foamable polyurethane composition. The panels are made on a continuously advancing means by successively depositing, and forming layers therefrom, a plurality of accurately metered amounts of foamable or non-foamable polyurethane forming compositions. Rigid polyurethane foam panels comprised of any number of individually formed layers and possessing a variety of density characteristics can be made according to the method.

The polyurethane foam panels can be given decorative surface appearances simultaneously with the production thereof. A continuous sheet of a material having a surface design embodied therein is disposed over, and advanced forwardly with the continuously advancing means on which the integral foam panels are manufactured. The panel is formed on the textured or embossed sheet with the panel surface which contacts the sheet readily acquiring the surface characteristics thereof.

8 Claims, 2 Drawing Figures

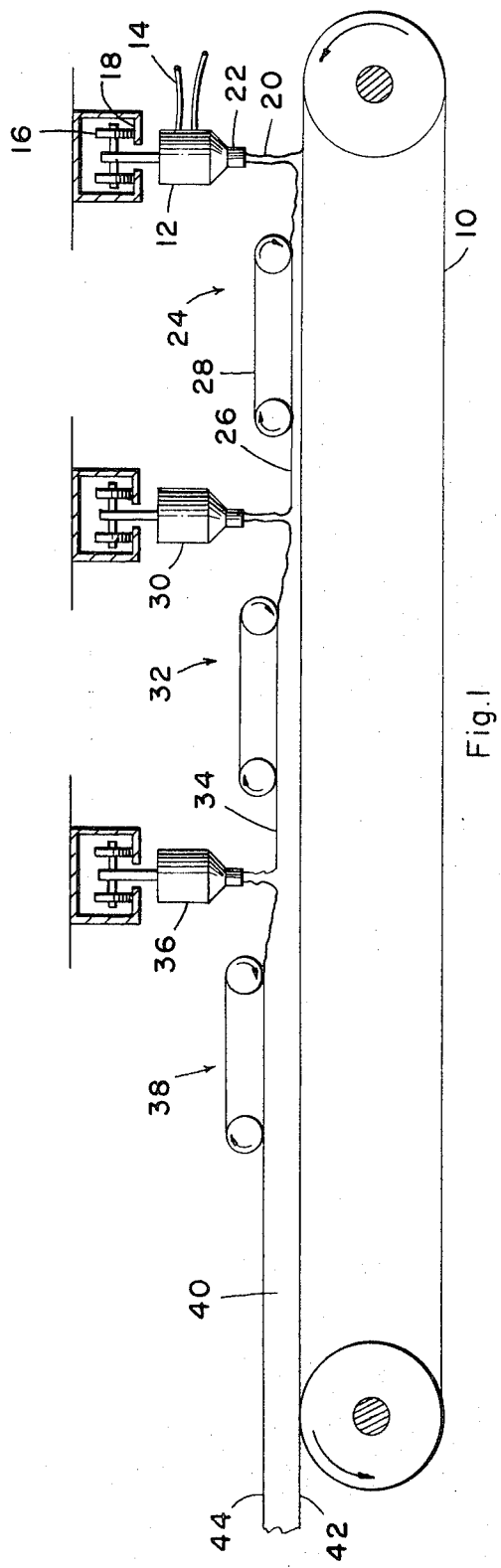
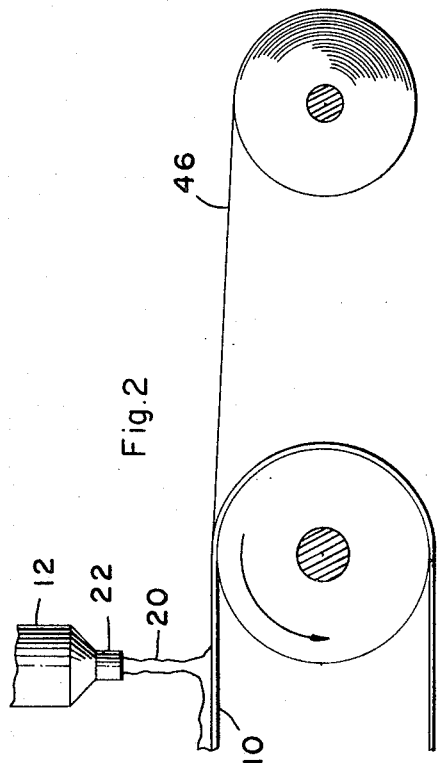

METHOD FOR PRODUCTION OF RIGID POLYURETHANE ARTICLES

BACKGROUND OF THE INVENTION

Polyurethane foams are cellular synthetic polymers which are generally formed by the polymerization of a polyisocyanate with an active hydrogen-containing polyester, polyether or polyol. These compounds are well known in the art and are available in a variety of trademarks and trade names. Flexible, semi-rigid and rigid foams can be prepared, the rigidity thereof being dependent upon the characteristics of the particular active hydrogen-containing compound employed to react with the polyisocyanate to form the polyurethane.

Rigid polyurethane foams have become increasingly useful in the building industry since they possess many properties which make them extremely valuable in this field. They have great structural strength coupled with relatively low density and thus are particularly well suited for use as core materials in sandwich type structures between skins of metals such as aluminum or steel as well as various types of plastics. Rigid foams are also excellent heat insulators because of their fine closed cell structure. Furthermore, because of their excellent vibration damping properties, they can conveniently be used to support highly resonant loads and to isolate vibration therefrom.

The properties of rigid polyurethane foams would make them quite effective for use as wall panels, curtain walls, flooring materials, etc. in residential homes, offices and the like. Floor and wall panels made of rigid foam could be attached to substrates such as plywood or gypsum lath. In order to be practical for use in such applications the foam articles should possess overall relatively lightweight characteristics while having tough, relatively dense exterior surfaces which would be capable of withstanding the impacts that such articles can normally be expected to receive.

Polyurethane foam panels having tough, relatively more dense skins in comparison to the main body thereof have been prepared by molding techniques utilizing elevated temperatures and pressures. A known method consists of charging a mold with a quantity of a foamable polyurethane forming composition in excess of that which would be required to fill the mold cavity if allowed to expand against atmospheric pressure. When terminal foaming occurs a positive pressure is exerted on all the mold surfaces and when the terminal foaming has subsided there is produced a foamed article having essentially continuous, dense exterior surfaces with a foamed interior structure. Methods of this type have not been completely satisfactory for equipment costs are relatively high and an excess of the foamable composition is required thus increasing material costs. Moreover the range of the density gradient which can be achieved in an article prepared in this manner is limited.

Foam articles used for the purposes described above would also be required to have attractive decorative visible surfaces to provide pleasing aesthetic effects. Heretofore, polyurethane foam products with textured or embossed surfaces have been made primarily in molds having the surface design imprinted therein. These molds are generally not of very large dimensions in the small thicknesses required for wall panels, etc. because of the difficulty in filling the molds uniformly. Because of problems of this nature it has heretofore not been economically feasible to manufacture, on a commercial production scale, polyurethane foam panels having decorative surface appearances in dimensions sufficient to allow them to be employed as wall panels, curtain walls and the like.

SUMMARY OF THE INVENTION

It is an object of the invention to provide a continuous method for manufacturing rigid polyurethane foam panels having a density gradient across their thickness. It is another object to provide such a method by which it is possible to manufacture panels which have at least one substantially continuous, dense exterior surface with a foamed core portion of considerably lower density. Yet another object is to provide a method capable of making such panels in relatively large dimensions suitable for use as wall panels and the like. Still another object is to provide a continuous method which can be practiced on a commercial production scale thus permitting such articles to be made at economically competitive rates and with the least amount of foamable composition per unit area of any thickness.

It is a further object of the invention to provide a method for manufacturing, on a continuous production scale, relatively large, rigid polyurethane foam panels having at least one decorative face surface. Still further, it is an object to provide such a method whereby a decorative appearance can be imparted to at least one face surface of a polyurethane foam panel having a density gradient across its thickness during the production thereof.

The present invention contemplates depositing, as by casting or spraying, a plurality of accurately metered quantities of polyurethane forming compositions on a continuously advancing means, e.g., an endless conveyor belt, to form an integral foam panel comprised of a plurality of individual layers intimately bonded together. The initial deposit is made on the advancing conveyor belt and each succeeding quantity is deposited on the layer formed by the previous deposition after the latter has been cured to an extent whereby a self-supporting layer exists. Both foamable and non-foamable polyurethane forming compositions can be employed according to the practice of the method. The densities of the foam layers can be varied by altering the formulated foam density of, and/or the restraining forces exerted against the vertical expansion of the separately deposited quantities of foamable polyurethane composition. The individually formed layers bond intimately to each other thus constructing an integral panel; the integral panel may consist of any number of layers. The ultimate thickness of polyurethane foam panels made according to the method of the invention and the number of individual layers which comprise the integral panels are limited only by the dimensions of the apparatus employed for their manufacture and the number of stations provided thereon for the deposition of polyurethane forming compositions.

Where the integral panels consist solely of foamed polyurethane layers the density gradient across their thickness is achieved by varying the formulated foam density of, and/or the restraining forces exerted against the vertical expansion of the separately deposited quantities of foamable polyurethane forming composition. It is well known to those skilled in the art that a foamable polyurethane forming composition will yield a foam of a particular density when allowed to expand free of any vertical restraint and foams of various other densities when made to expand vertically while being subjected to varying restraining forces. Thus by varying the restraint against which the individual foam layers are required to expand, layers of substantially differing densities can be made from the same foamable composition.

The range of foam layer densities attainable when employing a single foamable polyurethane forming composition is limited by operational considerations. Since relatively high pressures are generated during the expansion of polyurethane polymers by gaseous matter the degree of restraint which can be successfully exerted against the vertical expansion thereof is restricted by the capabilities of the apparatus on which the foam is manufactured as is readily evident to those skilled in the art. Typically the type of equipment on which polyurethane foam articles would be made on a continuous production basis would not be capable of withstanding very great pressures. In order to form individual foam layers having widely disparate densities, foamable compositions formulated to different densities are employed. Through the use of either of the two techniques described, or a combination of both, integral foam panels having diverse density characteristics can be manufactured.

The method of the invention can also be utilized to effectively manufacture an integral panel having at least one essentially continuous, dense face surface with a foamed interior structure of considerably lower density. The dense exterior skin is made from a non-foamable polyurethane composition. Initially a thin layer of the non-foamable composition, preferably highly catalyzed to promote relatively fast curing of the polymer is deposited on the endless conveyor belt. The conveyor belt may also be heated to assist in the curing process. When the composition reaches a gel state, i.e., when it has been cured to an extent whereby it takes on the form of a continuous self-supporting film or layer the next deposit can be laid down thereon. Any number of foamed layers of considerably lower densities can be formed over the dense face surface according to the procedures described above. As the conveyor belt advances the polyurethane forming resin face layer proceeds to a substantially completely cured state thus becoming a tough, dense, relatively impermeable skin. Subsequently the other face surface may be given a dense skin by depositing a layer of the non-foamable composition over the interior foamed portion of the integral panel.

The invention further encompasses a method for imparting decorative appearances to at least one face surface of the panels as they are manufactured. Polyurethane forming compositions readily acquire the surface characteristics of plates, molds or other means on which they are formed into various articles. Thus foam articles having simulated face appearances corresponding to wood grain, slate or the like can conveniently be made. According to the invention this result is accomplished by disposing over, and advancing with the continuously advancing means on which the panels are made a thin continuous sheet of a release material having the desired design embodied therein. The material can be release paper, aluminum, polyethylene or the like. The polyurethane panels are formed thereon and the face surface of the panels which contacts the design-containing material readily acquires a decorative appearance.

Referring to the drawings:

FIG. 1 is a schematic representation of a side view of a preferred apparatus for the practice of the invention;

FIG. 2 is a schematic representation of a side view of the front section of the apparatus shown in FIG. 1 as adapted in accordance with a preferred embodiment of the invention.

Any standard formable polyurethane forming composition suitable for the formation of rigid foams can be utilized in the manufacture of foam articles according to the method of the invention. Generally the composition is comprised of an organic polyisocyanate, an active hydrogen-containing compound and a gas generating agent. The gaseous matter which serves to expand the polyurethane polymer can be supplied by reacting a part of the organic polyisocyanate content of the formulation with water to generate carbon dioxide gas; or by incorporating into the formulation an inert, relatively low boiling organic liquid which is easily vaporizable by the heat of the reaction. Conceivably both of these methods of generating gaseous matter could be used together. The non-foamable compositions which are used to form the dense skins for the foam articles are generally similar to the foamable compositions with the exception that the former contain no gas generating agent.

The polyurethane polymers can be made according to the "one-shot" method in which all of the components of the formulation are brought together at the same time whereupon the complete reaction takes place. They can also be formed by the so-called "pre-polymer" technique wherein a part of the polyfunctional active hydrogen-containing compound content of the formulation is initially reacted with the organic polyisocyanate to form a semi-polymer which is then brought together with the remaining ingredients of the formulation to take part in the polymer-forming reaction.

A preferred embodiment of the method consists of first preparing reactants to form a rigid synthetic foam generally in accordance with known prior practice as follows:

Into one mixing tank is placed a mixture of the polyisocyanate content of the formulation and about 30 to 40 percent of a stoichiometric quantity of a polyfunctional active hydrogen-containing compound. These components are reacted to form a semi-polymer and cooled. Where a relatively low boiling, inert organic liquid such as a fluorinated hydrocarbon is used as the blowing agent it is preferably then placed in this tank. The remainder of the polyfunctional active hydrogen containing compound content of the formulation along with a catalyst and a surfactant are placed in a second tank.

The contents of the two tanks are mixed after having been metered into a high speed mixing head in accurately controlled amounts and then deposited. Subsequently the blowing agent is volatilized by the exothermic reaction which completes the polymerization of the synthetic resin.

FIG. 1 is a purely schematic representation of a side view of a commercial scale polyurethane foam panel machine which is preferred for the practice of the invention. The panels are preferably manufactured in a trough of generally rectangular cross section formed by a paper web or a similar membrane. The paper trough is carried forward on a rigidly supported conveyor belt 10 so constructed as to provide support for the bottom and two sides thereof. A high speed mixing chamber 12 including a plurality of feed hoses 14 is supported by rollers 16 mounted on an overhead track 18 which is in turn affixed to support means. The mixing chamber 12 is adapted to reciprocate laterally across the width of the conveyor belt 10. The components of the polyurethane forming composition are supplied through the feed hoses 14 into the mixing chamber 12 wherein they are thoroughly agitated and from whence the reactant mixture 20 is deposited through a spray nozzle 22 in accurately metered quantities onto the forwardly advancing paper trough.

As the conveyor belt 10 advances forwardly the reaction between the free-NCO groups of the polyisocyanate and the active hydrogen-containing compound proceeds to completion and the synthetic polymer thus formed begins to expand. The formable polyurethane forming compositions which are employed in the formation of foam articles according to the invention react and foam in a relatively short period of time, e.g. about 1 minute or less, after the reactants are brought together.

The apparatus has fixed sidewalls (not shown) which exert a constant restraining force against the horizontal expansion of the foam throughout the manufacture of the foam panels. As the foaming mass advances forwardly it enters a zone having upper restraining means 24 adapted to exert a restraining force against the vertical expansion of the foaming mass. By predetermining the degree of the restraint in relation to the particular foamable composition used a foam layer 26 having a desired density is obtained. The restraint applied against the vertical rise of the foam is maintained until the foam is substantially completely cured. By the expression "cured" as applied to polyurethane foams prepared in this manner is meant that the foam has had time to set or to reach the maximum volume permitted by the restraining surface after the original production thereof.

Various means can be utilized to provide the vertical restraint. It is preferred to use a continuous moving belt 28, driven at the same speed as the conveyor belt 10, for this purpose. The surface of the continuous belt 28 which contacts the foam is preferably treated with a polyurethane release agent such as a silicone or covered with a facing layer of a material such as polyethylene, polypropylene or the like to prevent the foam from adhering to the surface.

As the foam layer 26 advances from the restraint zone it passes beneath a second mixing head 30 of the same type previously described and arranged to function in the same manner. Another accurately metered amount of foamable composition 20 is deposited therefrom on the upper surface of the foam layer 26. For the purpose of reducing handling and mixing of the compounds involved it is preferred to use a single foamable composition throughout where it is feasible to do so. However, as discussed hereinabove, when the foam layers are to have widely disparate densities it is preferable to employ compositions formulated to different densities. The layer 26 having the foaming mixture on its surface then enters a second zone having upper restraining means 32, in this illustration identical to upper restraining means 24. The restraint exerted by the restraining means 32 against the vertical expansion of the secondly deposited quantity of foamable composition is varied from that which was applied by restraining means 24 against the vertical rise of the initially deposited amount. Again the restraint is maintained until the second individual foam layer has been substantially completely cured.

As the integral foam panel 34 emerges from the second restraint zone the upper portion of the panel 34 has a density which is different from that of the lower portion thereof. The two individually formed foam layers bond intimately to each other. It is preferred to make the most dense foam layer initially and subsequently form the less dense layers thereover.

A third mixing chamber 36 of the same type described above and mounted in the same manner as well as a third upper restraining means 38 are shown in FIG. 1. It should be recognized that there may be any number of stations at which a polyurethane forming composition can be deposited on the paper trough or the surface of a foam layer. Vertical restraining means can be located forwardly of each of the mixing chambers; however, the individual layer being formed at any juncture during the practice of the method can be allowed to expand vertically without any restraining force being applied. A layer of substantially uniform thickness can be obtained with this procedure by accurately controlling the quantity of foamable composition deposited from the spray nozzle.

When the completed integral panel 40 reaches the end of the machine it is cut to a desired length and removed therefrom. It is readily apparent that polyurethane foam panels with greatly varying physical properties can be made according to the invention. The face surfaces 42 and 44 of the integral panel 40 could be composed of foamed layers of substantially equal densities with a foamed interior structure of lower density. A relatively lightweight panel could be made with thin face surfaces of substantially continuous, dense layers of unfoamed polyurethane resin along with a relatively thick foamed interior structure of considerably lower density. Such articles could have face surfaces with densities of up to about 50 pounds per cubic foot with a core density as low as 5 pounds per cubic foot or less.

Decorative surface appearances can also be imparted to the foam panels during the manufacture thereof according to the invention. Relatively thin continuous webs or films of paper, aluminum, polyethylene or like materials having an embossed or textured surface are employed for this purpose. Such materials will be referred to hereinafter as surface forming materials. According to a preferred embodiment of the invention a sheet of a surface forming material is disposed over, and advanced with an endless conveyor belt. The initial deposit of an appropriately pigmented polyurethane forming composition, whether foamable or non-foamable, is made directly on the sheet. The method then proceeds as previously described. The foam panels thus made readily acquire a simulated appearance on a face surface thereof corresponding to the design embodied in the surface forming material.

FIG. 2 is a schematic representation of a side view of the front section of the apparatus shown in FIG. 1. A roll of surface forming material 46 is positioned on supporting means adjacent to the conveyor belt 10. The sheet of surface forming material 46 is disposed on and carried by the conveyor belt. The integral foam panel is thus formed directly on the sheet whereby a smooth or textured face surface appearance can be imparted thereto. The panel, appropriately pigmented, can be given a simulated wood grain, slate or like appearance. The continuous sheet of surface forming material is separated from the foam panel when the latter is removed from the machine and it is then collected for subsequent re-use in the same manner.

For panels which are intended in uses wherein only the exterior face surface is visible, e.g. wall paneling erected over a substrate, imparting a decorative appearance to only the visible surface is sufficient. In cases where the panels are intended for applications wherein both face surfaces are visible, e.g. self-supporting curtain walls, they must both be given a decorative appearance. This can be done by adhering a sheet of the surface forming material to the surface of the restraining means arranged to contact the lastly formed layer of the panel; or by depositing the sheet over the final deposit of polyurethane forming composition while it is in a substantially fluid state. The dimensions of the apparatus used to manufacture the panels will dictate to a large extent which technique can be utilized for the sheet of surface forming material must be kept in contact with the surface of the panel until it has been substantially completely cured. Where the final layer of the integral panel is made from a foamable composition it is preferred to adhere the sheet of surface forming material to the restraining means. When the final deposit is of a non-foamable composition in order to form a substantially continuous, dense skin it is preferred to dispose a sheet of the surface forming material over the composition while it is in a substantially fluid state. The sheet is separated from the panel when the latter is removed from the machine.

Although the technique of imparting decorative surface appearances has been described in relation to the production of panels having a density gradient across their thickness it should be recognized that it is not limited to such use. It is preferred for use in the production of panels of this type; however, panels of uniform density throughout, typically made from a single deposit of a foamable polyurethane forming composition, can also be given decorative surface appearances in the manner described. When only one face surface is to be formed in this manner it is preferred to allow the foam layer to expand vertically free of any restraint. The thickness of the layer in this instance can be closely controlled by accurately metering the quantity of foamable composition deposited by the traversing spray nozzle.

The advantages of this novel method for manufacturing rigid polyurethane foam products are numerous. The versatility of the method enables it to be used to make articles which are suitable for many end applications. Moreover, a substantially higher production rate can be attained in the production of foam articles according to the invention than is possible with the molding techniques heretofore employed thus leading to significant reductions in processing costs.

Having given a detailed description of the preferred embodiments of the invention so that those skilled in the art may practice the same we contemplate that variations may be made therein.

What we claim is:

1. The method of continuously producing relatively wide wall panels consisting essentially solely of rigid polyurethane comprising the steps of depositing a thin first layer of a rigid polyurethane forming composition on a continuously advancing substantially flat supporting means substantially uniformly throughout the width and along the length thereof and allowing a substantially self-sustaining, at least partly cured rigid polyurethane layer to form therefrom, depositing in a similarly uniform manner at least one additional thin layer of a rigid polyurethane forming composition over the entire top surface of said first polyurethane layer and allowing substantial completion of all potential foaming and substantial curing of each layer respectively for approximately 1 minute, prior to depositing of another layer thereon, at least one of said additional layers forming a rigid polyurethane of a density substantially different from the density of said first layer, at least one of said layers being a foamed rigid polyurethane, and allowing completion of the curing of all said layers.

2. The method of claim 1 wherein said first layer consists essentially of a non-foaming rigid polyurethane forming composition.

3. The method of claim 2 wherein the last layer deposited is of the same composition as the said first layer, and wherein at least one intermediate layer consists essentially of a foamable rigid polyurethane forming composition.

4. The method of claim 1 comprising the further step of restraining the flow of said rigid polyurethane forming compositions along the side edges of said continuously advancing supporting means, whereby a plurality of layers of uniform thickness throughout are formed.

5. The method of claim 4, comprising the further step of restraining the rise of the foamed polyurethane layer.

6. The method of claim 4 wherein at least two of said layers are foamed rigid polyurethane, comprising the further steps of restraining the rise of the foamed polyurethane of said layers to a different degree with one layer relative to the other layer.

7. The method of claim 1 comprising the further step of forming a decorative bottom surface on said first layer by forming said first layer on a design containing continuously advancing supporting means.

8. The method of claim 1 comprising the further step of forming a decorative top surface on the last formed layer by restraining the rise of the foamed polyurethane by a continuously advancing means containing a design applied atop said last formed layer.

* * * * *